United States Patent [19]

Brown

[11] Patent Number: 5,232,408
[45] Date of Patent: Aug. 3, 1993

[54] FLEXIBLE TAPE DRIVE SYSTEM
[75] Inventor: Michael E. Brown, Mason, Ohio
[73] Assignee: E. F. Bavis & Associates, Inc., Maineville, Ohio
[21] Appl. No.: 889,038
[22] Filed: May 26, 1992
[51] Int. Cl.⁵ .................... F16H 7/18; F16H 55/30
[52] U.S. Cl. ..................... 474/140; 474/164; 474/205; 226/80; 226/172
[58] Field of Search .............. 474/140, 164, 202, 205; 156/344, 361, 584; 226/170, 172, 80, 5

[56] References Cited
U.S. PATENT DOCUMENTS

| | | | |
|---|---|---|---|
| 2,362,204 | 11/1944 | Howell | 474/140 X |
| 2,422,310 | 6/1947 | Nemeth | 226/83 |
| 2,674,454 | 4/1954 | Mennecke | 226/83 |
| 2,781,841 | 2/1957 | Dignan | 226/82 X |
| 3,083,613 | 4/1963 | Mees . | |
| 3,519,184 | 7/1970 | Kotte et al. . | |
| 4,093,065 | 6/1978 | Temme . | |
| 4,624,359 | 11/1986 | Gross . | |
| 4,869,708 | 9/1989 | Hoffman et al. | 474/140 |
| 4,953,692 | 9/1990 | Stoppani et al. | 198/834 |
| 5,054,605 | 10/1991 | Bavis | 198/750 |
| 5,165,586 | 11/1992 | Unuma | 226/170 X |

FOREIGN PATENT DOCUMENTS

| | | | |
|---|---|---|---|
| 565003 | 8/1977 | U.S.S.R. | 198/834 |
| 1207918A | 1/1986 | U.S.S.R. | 198/834 |
| 2084634 | 4/1982 | United Kingdom . | |

Primary Examiner—Ramon S. Britts
Assistant Examiner—Roger J. Schoeppel
Attorney, Agent, or Firm—Frost & Jacobs

[57] ABSTRACT

A flexible tape drive system of the type having a flexible yet relatively longitudinally rigid perforated drive tape which is reciprocated by a toothed cog drive arrangement to provide both push and pull driving power. The drive system includes a substantially circular cog wheel having an outer base surface of a predetermined diameter and a plurality of radially extending cog teeth spaced about the periphery of the outer base surface. A cog wheel surround includes an outer guide track having an inner cog race with an inner surface of a diameter slightly larger than the base diameter of the cog and spaced substantially parallel therewith. A pair of oppositely disposed peeler tips are situated adjacent the top of the cog wheel surround between the outer guide track and the cog wheel, each including a peeler edge which has an arcuate inner face extending from the edge at a non-parallel orientation relatively to the base surface of the cog. In this way, the peeler edge of each of the peeler tips is inwardly disposed toward the base surface to more effectively peel the drive tape away from the cog wheel even under conditions of high compression force on the flexible tape and/or at increased speeds of rotation. The inwardly disposed orientation can be accomplished by locating the peeler edges on a radius substantially equal to the radius of the outer base surface but having an offset point of origin, or by providing the peeler edges on a non-concentric and smaller radius.

20 Claims, 3 Drawing Sheets

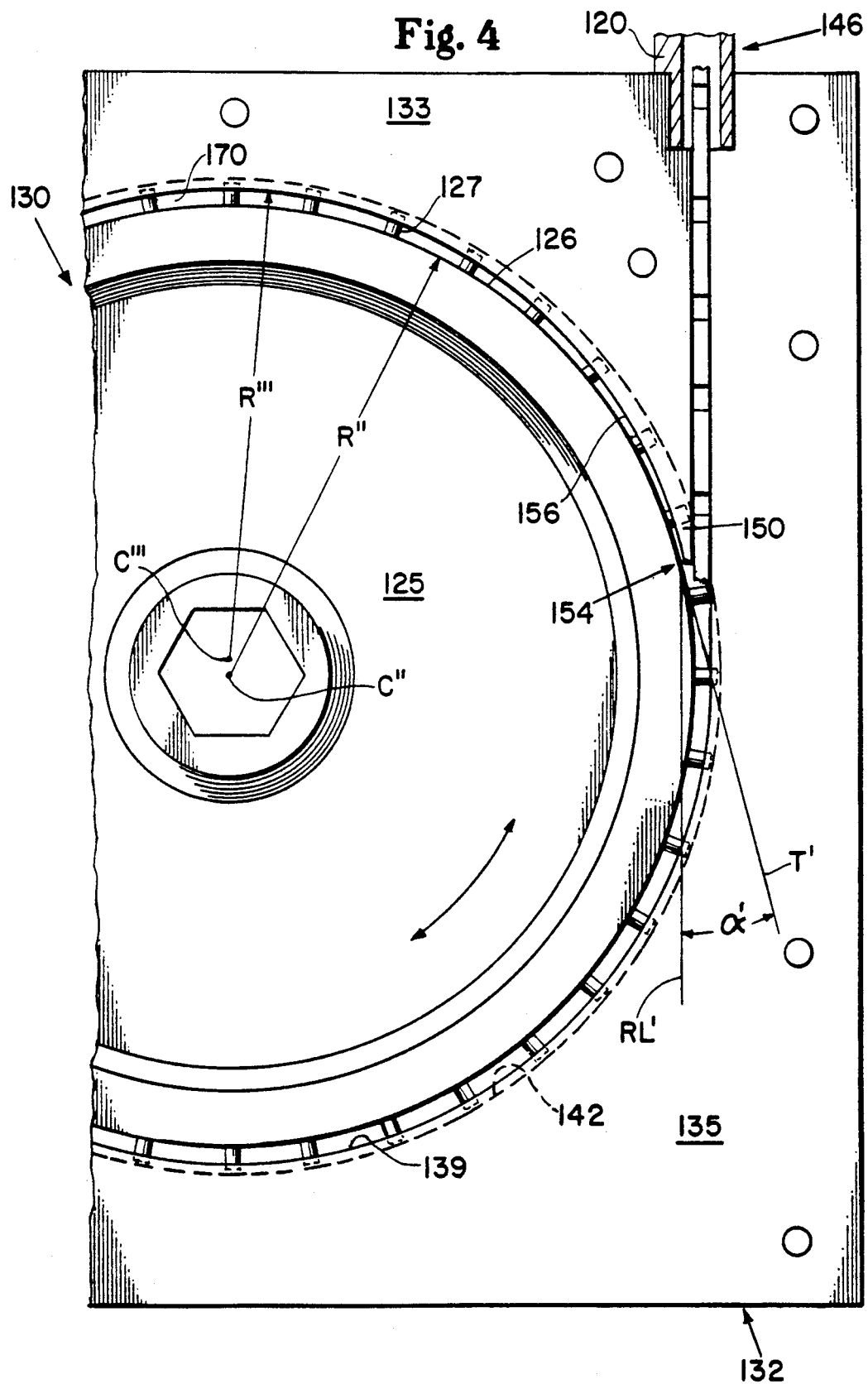

FLEXIBLE TAPE DRIVE SYSTEM

TECHNICAL FIELD

This invention relates to flexible tape drive systems wherein a flexible yet relatively longitudinally rigid perforated drive tape is reciprocated about a toothed cog wheel to provide push/pull driving power for a delivery system or the like, and, more particularly, to a flexible tape drive system including a pair of oppositely disposed peeler tips situated adjacent the top of a cog wheel surround and being angled inwardly to effectively peel the drive tape away from the cog wheel as alternate tension and compression is imposed on the tape in use.

BACKGROUND ART

In a growing variety of business applications, it is desirable and/or necessary to convey items such as cash, currency, documents, food, messages and other items between spaced apart stations. In many situations, somewhat flexible yet relatively longitudinally rigid drive tape provides a reliable yet highly adaptable drive system which minimizes the requirements for expensive and inconvenient pneumatic setups, or long lengths of chains and/or complex gearing arrangements to adapt to twists and turns along the transport path.

For example, Edward F. Bavis U.S. Pat. No. 5,054,605, which issued on Oct. 8, 1991, shows and describes a preferred flexible drive conveyor system for use in drive-in banks and similar remote transaction applications. Particularly, the Bavis patent sets forth a relatively simple and reliable conveyor system utilizing flexible tape as the drive medium. As set forth in that patent, the width and depth of the guide path provided for the drive tape is to be chosen to accommodate the natural tendency of the tape to bend somewhat under compression in a sinuous manner. As also set forth in this patent, because the drive tape must be wound around a substantial portion of the periphery of the cog wheel to insure reliable driving interaction for both push and pull power, the drive tape will tend to adhere to the outer surface of the cog wheel, especially at higher speeds and/or under higher loads. While the peeler tips of the Bavis Conveyor System work nicely under most circumstances to prevent folding or binding of the drive tape within the surround, it has been found that in some applications, especially where relatively higher compressive loads and/or higher speeds of movement are present, potential for such folding or binding is increased. As can be understood, the potential for binding problems is also exacerbated in situations where larger diameter cog wheels and surrounds are utilized.

While other tape drive devices and applications have been known in the industry, most are directed to situations where the tape, film, or other flexible structure to be directed around a cog is not placed in a compression-drive mode and/or extends around only a small portion of the cog wheel. For example, the flexible drive system of U.S. Pat. No. 4,624,359 (which issued to J. Gross) utilizes a plurality of flexible drive elements which pass by a portion of the driving cogs situated between tape storage spools and slotted tracks. However, because the flexible tape does not wrap around a substantial portion of the drive sprocket, the tendency of the tape to adhere to the sprocket is avoided as the tape tends to naturally disengage therefrom. Similarly, the ticket issuing machine of U.S. Pat. No. 2,781,841 (which issued to P. Dignan) passes a ticket strip around a portion of a ticket feed wheel with a plurality of outwardly extending radial spokes which interact with openings in the tickets to successively dispense the tickets. In addition to the less than 90° wrap of the ticket strip around the feed wheel, the relative speed of movement of the feed wheel is low, and the ticket strip naturally tends to bend away from the feed wheel. Consequently, these applications and devices do not address flexible drive tape arrangements which require a drive tape to be wrapped around a substantial portion (e.g., 120° or more) of a drive cog, and generally have no need for a tape peeling device.

Similarly, there are a great number of patents directed to maintaining a length of flexible film adjacent a feed sprocket device to enable the transport of the film for motion pictures or the like. For example, U.S. Pat. Nos. 2,362,204 (A. Howell), 2,422,310 (O. Nemeth), 2,674,454 (H. Mennecke), 3,083,613 (R. Mees), and 3,519,184 (J. Kotte et al.) pertain to film-type applications wherein the flexible film has a tendency to pull off or away from the feed sprocket device. Consequently, these structures are generally directed to maintaining the flexible tape in contact with the sprocket or other driving device, and are antithetical to stripping the flexible tape from such device.

On the other hand, a number of chain scraping devices and the like have been directed to separating link-type chain from a chain sprocket. However, by their very nature, chain-type drive arrangements cannot provide compression-type driving forces, and are limited solely to tension drive applications. Additionally, many chain-type conveyors are designed for single direction use. For example, the Soviet reference 565-003 illustrates a remover device for round-linked conveyor chains, wherein a spring-loaded rocker piece rides continuously on the periphery of the sprocket to lift the individual links of the chain on the slack side of the sprocket.

Similarly, U.S. Pat. No. 4,953,692 (which issued to B. Stoppani et al.) includes a chain stripping device designed to insure that chain links on the slack side of the sprocket do not remain on the sprocket as it is rotated. Similar devices can be seen in U.S. Pat. No. 4,093,065 (which issued to H. Temme), U.K. Patent application 2,084,634 (H. Linke et al.) and Soviet document 1207-918-A, which pertain to chain lifter or stripper devices for scraper-chain conveyors, and comprise generally arcuate members to engage and separate the chain from the chain wheel. These devices, however, are again directed to stripping individual links from the non-loaded side of a chain sprocket. In effect, these devices prevent the slack portions of the chain from inadvertently falling into the inside portions of the sprocket. Moreover, these arcuate members are generally aligned in a substantially parallel arrangement with the outer surface of the chain sprocket, are not directed to preventing folding or jamming of flexible tape which tends to adhere to a drive cog around which it is wrapped.

Consequently, heretofore, while the peeler tips described in the Bavis Flexible Drive Conveyor System patent are capable of providing reliable prevention of folding or binding of the drive tape within the surround of a flexible drive tape system, under heavy loading, and/or in applications utilizing larger cog wheel/surround combinations, and in situations where the cog wheel is operated at increased speeds, occasional instances of binding have been experienced. In this regard, an improved flexible tape drive system is desirable in such instances to more fully obviate the risk of drive tape folding or binding.

DISCLOSURE OF THE INVENTION

It is an object of this invention to provide an improved flexible tape drive system for applications wherein a flexible yet relatively longitudinally rigid perforated drive tape is reciprocated by a toothed cog drive arrangement to provide both push and pull driving power, and wherein the risk of drive tape folding or binding within the cog surround is effectively obviated.

It is another object of the present invention to provide a modified cog wheel surround assembly for a flexible tape drive system wherein a pair of oppositely disposed peeler tips are oriented in a non-parallel orientation relative to the base surface of the cog wheel to more positively peel the drive tape away from the rotating cog wheel.

It is also an object of the present invention to provide an improved flexible tape drive system wherein a flexible yet relatively longitudinally rigid perforated drive tape is wrapped around a substantial portion of a toothed cog drive wheel, and wherein a pair of oppositely disposed tape peeler tips are effectively inwardly disposed in a non-parallel orientation with the base surface of the cog wheel to minimize the risk of tape folding or binding between the surround and the cog wheel under increased load and/or rotation speed of the cog wheel and tape.

It is yet another object of the present invention to provide an improved arrangement of a pair of oppositely disposed peeler tips adjacent the top of a cog wheel surround assembly for a flexible tape drive system wherein the peeler tips each have a peeler edge with an arcuate inner face oriented with respect to the base surface of the cog wheel in a non-parallel manner such that the peeler edge of each is disposed inwardly toward the base surface to peel the drive tape away from the cog wheel.

It is another object of the present invention to provide a pair of oppositely disposed peeler tips oriented on a common radius which is substantially equal to the radius of the base diameter of the cog wheel of a flexible tape drive system, with the center of origin of the peeler tip radius being offset or spaced a predetermined distance from the center of origin of the cog wheel radius.

It is yet another object of the present invention to provide a unique arrangement of a pair of oppositely disposed peeler tips for a flexible tape drive system, wherein the peeler tips are oriented on a substantially common predetermined radius, with that radius being smaller than the radius of the base surface of the toothed cog drive of the system.

In accordance with one aspect of the present invention there is provided an improved flexible tape drive system of the type having a flexible yet relatively longitudinally rigid perforated drive tape which is reciprocated by a toothed cog drive arrangement to provide both push and pull driving power. The drive system includes a substantially circular cog wheel having an outer base surface at a predetermined radius and a plurality of radially extending cog teeth spaced about the periphery of the outer base surface. A cog wheel surround is provided with a top and bottom portion, and includes an outer guide track having an inner cog race with an inner surface of a diameter slightly larger than the base diameter of the cog and spaced substantially parallel thereto. Spaced tape entrance and exit slots are provided adjacent the top of the cog surround through which the flexible drive tape reciprocably enters and exits the cog wheel surround. Within the surround, the flexible tape wraps around a substantial portion of the cog wheel. A pair of oppositely disposed peeler tips are situated adjacent the top of the cog wheel surround between the outer guide track and the cog wheel. The peeler tips each include a peeler edge which has an arcuate inner face extending from the edge at a non-parallel orientation relative to the base surface of the cog. In this way, the peeler edge of each of the peeler tips is inwardly disposed toward the base surface to more effectively peel the drive tape away from the cog wheel even under conditions of high compression force on the flexible tape and/or at increased speeds of rotation.

In a preferred embodiment, the arcuate inner surfaces of the oppositely disposed peeler tips are located on a substantially constant arcuate radius. In one preferred arrangement, the radius of the arcuate inner surface of the tips is substantially the same as the radius of the cog wheel surround, but having its center of origin offset a predetermined distance from the center of origin of the cog wheel radius. In another preferred embodiment, the radius of the arcuate inner surfaces of the tips is also non-concentric, but is smaller than the radius of the cog base surface.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

FIG. 4 is a partial, enlarged elevational view of an alternate preferred embodiment of an improved flexible tape drive system made in accordance with the present invention, wherein the arcuate inner surfaces of the tips are located on a substantially arcuate radius which is less than the radius of the cog surround.

DETAILED DESCRIPTION OF THE INVENTION

Figure 1:
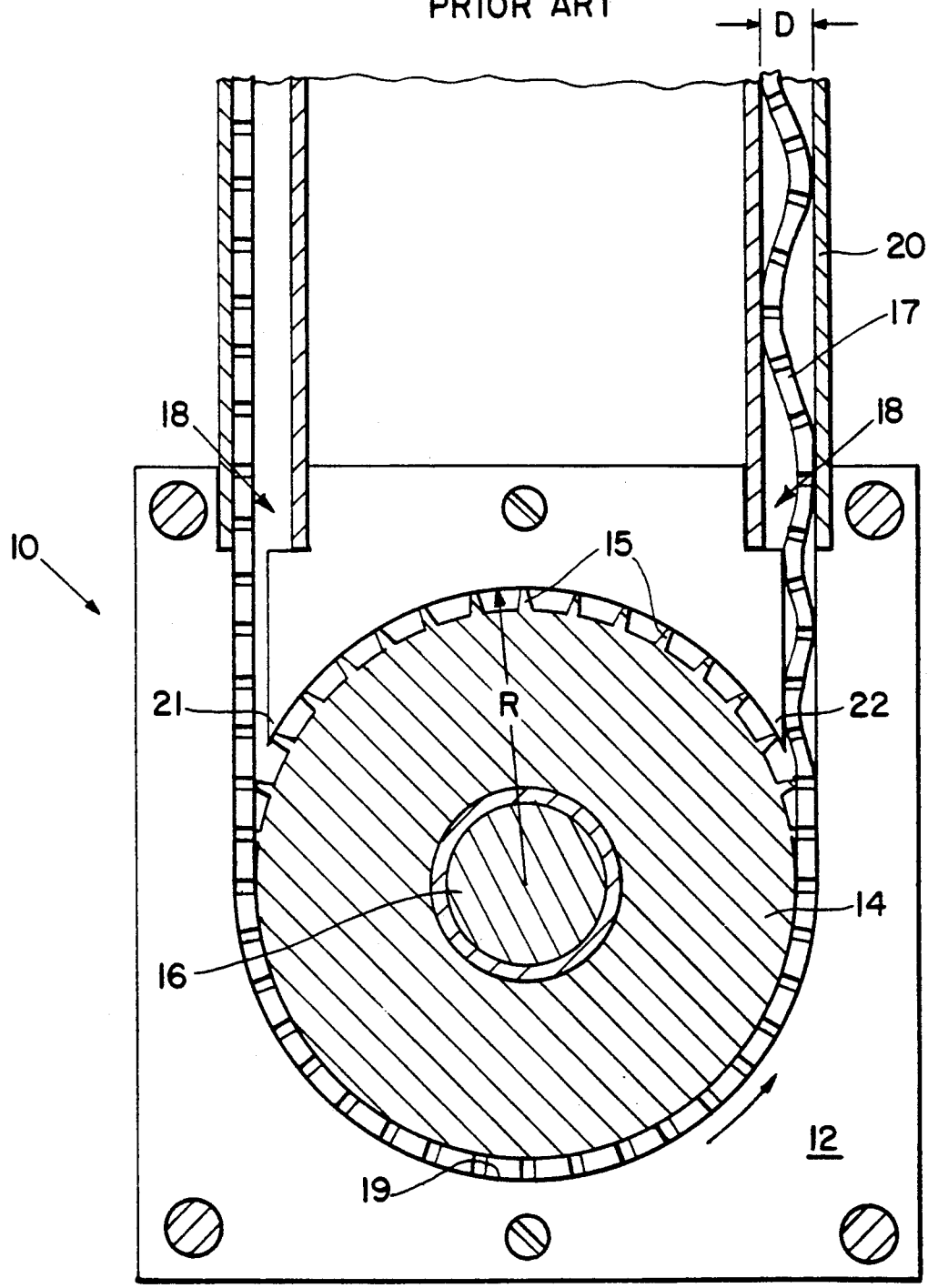
FIG. 1 is a partial cross-sectional view of a prior art flexible tape drive cog and surround arrangement.

Referring now to the drawings in detail, wherein like numerals indicate the same elements throughout the views, FIG. 1 is an enlarged partial cross-section view of a prior art flexible tape drive system such as illustrated and described in Edward F. Bavis U.S. Pat. No. 5,054,605, which issued on Oct. 8, 1991, the disclosure of such patent being hereby incorporated herein by reference. Particularly, FIG. 1 illustrates drive tape assembly 10 comprising a toothed cog wheel 14 having a predetermined inner radius R. Flexible drive tape 17, which can be preferably provided as a flexible yet relatively longitudinally rigid perforated tape (such as available under the name "Dymetrol" from E. I. DuPont of Fayetteville, North Carolina), and is wrapped around a substantial portion of the periphery of cog wheel 14 for providing both push and pull driving power for a remote teller device or other conveyor system.

As explained in the Bavis '605 patent, the width and depth of the guide track (e.g., 20) for the flexible tape must be chosen to permit relatively unencumbered movement of tape 17, while restraining the normal flexing of tape 17 as it is driven under compression loading. As seen in FIG. 1, tape 17 will naturally tend to bend in a somewhat sinuous manner under compressive loading, as seen by the series of peaks and valleys along the track 18 and guide track 20 extending from surround 12.

As contemplated in the Bavis '605 patent, cog wheel 14 is rotatably mounted on shaft 16 for rotation within the substantially cylindrical bore 19 of surround 12. Particularly, bore 19 receives cog wheel 14 and its outwardly disposed teeth 15 for rotation therewithin. Rotation of cog 14 causes drive tape 17 to be reciprocated to provide push or pull force to a carrier or other device attached adjacent the distal end of tape 17. Oppositely disposed peeler tips 21 and 22 are situated closely adjacent the opposite sides of cog wheel 14 at the positions nearest the outer diameter of teeth 15 where drive tape 17 must again assume a substantially longitudinal flat conformation in order to be guided through the entrance/exit slots (e.g., 18) into the associated guide tracks (e.g., 20).

As contemplated in the prior art, however, chain strippers and peeler tips were generally arranged so as to be substantially parallel with the outer peripheral surface of the rotating chain sprocket or cog wheel. For example, as illustrated in FIG. 1, a prior art flexible tape surround would generally be provided with an inner bore (e.g., 19) having a substantially constant radius (e.g., R).

Figure 2:
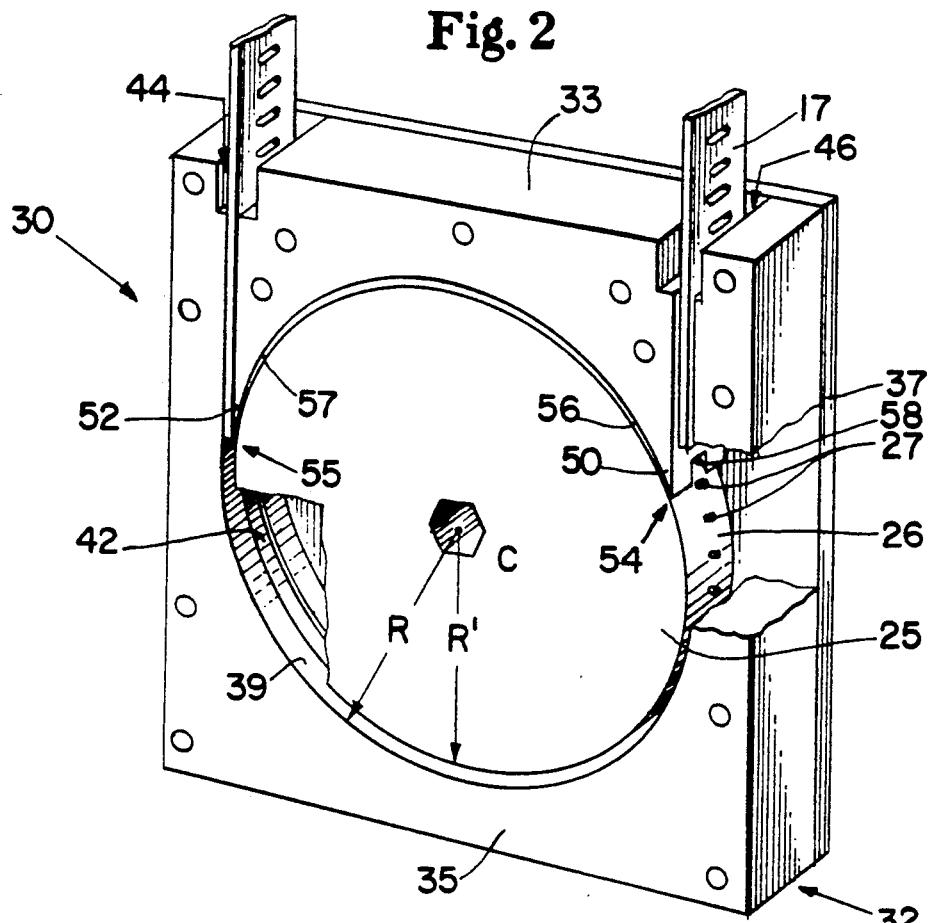
FIG. 2 is a partially broken out, partial perspective view of a flexible tape drive system embodying the present invention.

FIG. 2 shows a partial perspective view of a flexible tape driven system 30 made in accordance with the present invention, wherein a substantially circular cog wheel 25 is provided with an outer base surface 26 having a radius of R'. Cog wheel 25 further comprises a plurality of radially outwardly extending teeth 27 having an effective outer diameter greater than the diameter of the outer base surface 26, and, preferably, somewhat greater than the effective diameter (illustrated as radius R) of the inner surface or cog race 39 of cog wheel surround 32.

Cog wheel surround 32 preferably comprises a top portion 33 and a bottom portion 35 oriented with respect to one another by a common connection to a connection plate 37. While these portions can be part of a single, integral unit, surround 32 is illustrated as comprising several parts unified by a common connector plate 37. FIG. 2 has been partially broken away so that additional detail of the tape drive assembly 30 can be seen. Particularly, because the cog wheel teeth 27 extend outwardly beyond the nominal diameter of cog race 39 within the bottom portion of cog wheel surround 32, a peripheral groove 42 is preferably provided to accommodate cog teeth 27 without substantial interference. As illustrated, cog wheel surround 32 preferably comprises a pair of oppositely disposed entrance/exit slots (e.g. 44 and 46, respectively) through which the perforated tape 17 reciprocably enter and exits the surround 32 in use. As indicated, bottom portion 35 comprises a substantially cylindrical bore for accommodating cog wheel 25, with such bore having an effective radius R from center or origin C. Origin point C is preferably coincident with the axis of rotation of cog wheel 25.

A pair of oppositely disposed peeler tips 50 and 52, respectively, each having a relatively knife-like peeler edge (e.g., 54 and 55, respectively) are provided as part of the integral surround top portion 33. As illustrated, flexible drive tape 17 extends about a substantially portion of the periphery of outer base surface 26 of cog wheel 25. While the tape is shown as wrapping around at least 180° of the periphery of outer base surface 26, it is only required that the flexible tape extend around a sufficient portion of cog wheel 25 to provide positive reciprocation of drive tape 17 under both compression (i.e., push) and tension (i.e., pull) situations. In this regard, it is preferred that flexible tape 17 wrap around 120° or more of the periphery of cog wheel 25 in substantial contact with the outer base surface 26.

Because the relatively longitudinal rigid flexible tape 17 tends to adhere to outer base surface 26 of cog wheel 25 when wrapped around a substantial portion of the periphery thereof, peeler tips 50 and 52 are critical to insure that drive tape 17 is removed from contact with cog wheel 25 and directed through entrance/exit slots 44 and 46. Moreover, as illustrated with respect to the prior art cog surround shown in FIG. 1, under compression, drive tape 17 tends to move in a sinuous (or even sinusoidal) manner, having peaks and troughs along its length. While such bending and flexing actually results in reduced friction of movement of the drive tape along a guide track, it has been found that often tapes under heavy loads and/or reciprocated at high speeds may have peaks which coincide with the inner face of a peeler tip and the rotating cog. Under extreme circumstances, the peak of the sinusoidal waveform of drive tape 17 can work against and, in some cases, actually work its way underneath a peeler tip and become folded or bound between the cog wheel and the upper portions of the surround. It has been found, however, that the potential for such folding or binding can be substantially reduced by altering the orientation of peeler tips 50 and 52 relative to outer base surface 26 of the cog wheel.

Figure 3:
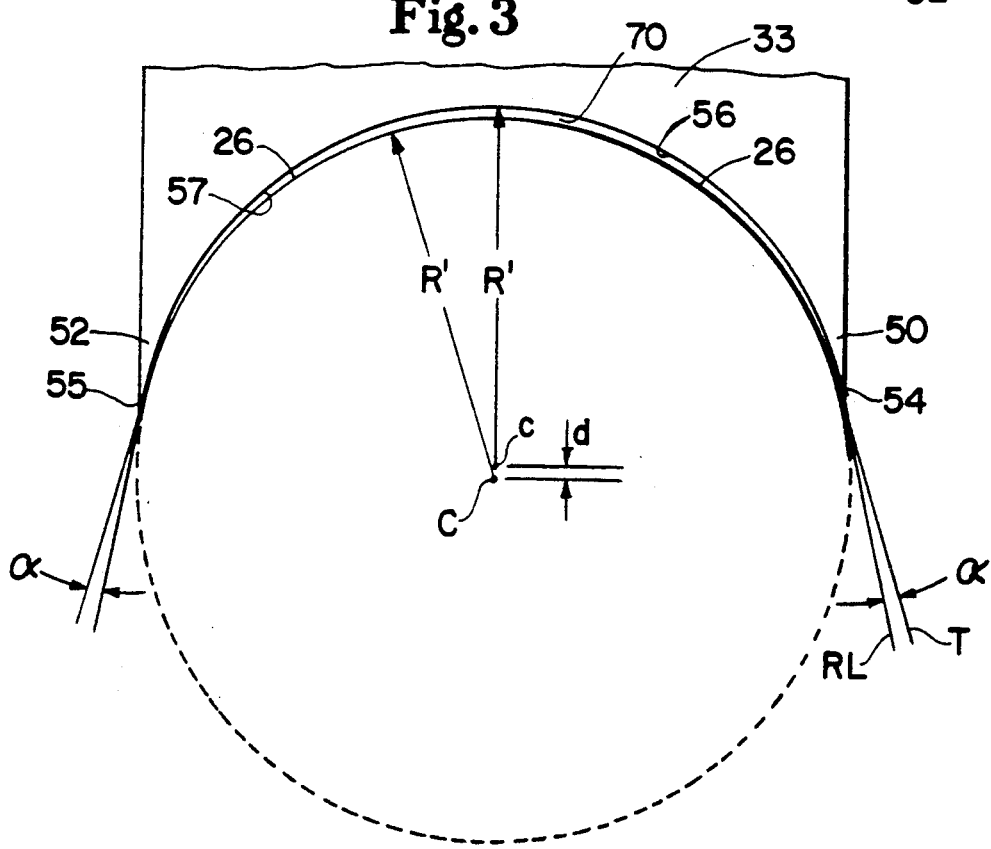
FIG. 3 is a schematic illustration of the relationship between the radius of the arcuate inner surfaces of the peeler tips and the radius of the base surface of the cog wheel.

Each peeler tip (50 and 52) includes an arcuate inner face (e.g., 56 and 57) extending from the respective peeler edges (e.g., 54 and 55) on a non-parallel angle relative to base surface 26. The non-parallel orientation of the arcuate inner faces 56 and 57 of surround top portion 33 are best seen in the schematic diagram of FIG. 3. For example, arcuate surface 56 is oriented at an angle $\alpha$ relative to outer base surface 26, as illustrated by the extended tangent line T and reference line RL shown in this figure. Similarly, arcuate surface 57 is oriented at an angle $\alpha$ with respect to base surface 26 adjacent peeler tip 52. Origin point or center point C is illustrated in FIG. 3, with the radius R' of base surface 26 being illustrated as the lower convex line. A second origin point (origin c) is shown as being offset a predetermined distance (d) from center point C. This second center point c is the center point about which arcuate inner surfaces 56 and 57 are preferably spaced. In a preferred embodiment, arcuate inner surfaces 56 and 57 are located on a substantially constant arcuate radius (e.g., R'). As will be appreciated, the shifting of the center point for arcuate surfaces 56 and 57 at a predetermined distance d (e.g., 0.02" or about 0.5 mm) situates the peeler edges (e.g., 54 and 55) at a non-parallel orientation relative to base surface 26, thereby effectively inwardly disposing each of these edges toward base surface 26 to more positively peel drive tape 17 away from cog wheel 25 in use. While it is contemplated that angle α will generally be a relatively acute, the specific angle of repose may differ among applications.

As also seen in FIG. 2, due to the relatively close and inwardly disposed orientation of peeler edges 54 and 55 adjacent outer base surface 26, it is preferred that respective tooth grooves or recesses (e.g., 58) be provided along peeler edges 54 and 55, respectively, to accommodate the outwardly extending cog teeth 27 without interference. In this way, peeler edges 54 and 55 can be inwardly oriented and spaced in close proximity with base surface 26 without adversely impacting performance characteristics of the system. Additionally, while proper choice of materials for the elements of the present tape drive system can minimize potential for static electric buildup in the system, a grounding strap (as mentioned in the referenced Bavis patent) may be desirable in some applications.

FIG. 4 illustrates an alternate preferred embodiment of the present invention, where the arcuate inner faces (e.g., 156) of surround top portion 133 are located from the center point or origin C"; spaced from the center point C" radius R" of outer base surface 126 of cog wheel 125 within surround 132. Flexible tape drive assembly 130 is provided with effectively inwardly disposed peeler tip edges (e.g., 154) each oriented at a non-parallel angle α' relative to base surface 126 by locating the arcuate inner faces along an arcuate radius R''', wherein R''' is smaller than R". The actual difference in the radii may vary depending on other variables such as relative size of the cog wheel, but may be as small as several thousandths of an inch (e.g., 0.5 mm). consequently, as opposed to the merely non-concentric but substantially equal radius of the arcuate inner faces shown with respect to assembly 30 of FIGS. 2 and 3, the non-parallel orientation of assembly 130 is provided by a top surround portion 133 which is non-concentric and has a smaller radius of curvature R'''.

The angular orientation of the peeler tip edges (e.g., 154) of this embodiment is thereby attained by a combination of differing radii lengths and non-concentricity, as opposed to non-concentric equivalent radii lengths. In either way, more effective peeling of the drive tape away from the outer base surface of the cog wheel is achieved by the inwardly disposed peeler edges. Moreover, as mentioned, closer effective tolerances of the spacing between the peeler edges and the outer base surface of the cog wheel can be achieved by the inward orientation of the peeler tips, without negatively effecting the overall manufacturing and assembly tolerances of the flexible tape drive system overall. As seen best in FIGS. 3 and 4, the gap (e.g., 70 and 170, respectively), between the outer base surface of the cog wheel and the inner lower surface of the surround top portion (e.g., 33 and 133) is slightly enlarged as a result of the non-concentric arrangement (FIG. 3) and the difference in radii (FIG. 4), actually allowing additional tolerance for manufacture and assembly. Because the flexible drive tape is not driven through the gap area (e.g., 70 and 170), this tolerance is not critical and can be enlarged, as illustrated, without harmful effects to the proper operation of the present flexible tape drive system.

Having shown and described the preferred embodiments of the present invention, further adaptions of the flexible tape drive system described herein can be accomplished by appropriate modifications by one of ordinary skill in the art without departing from the scope of the present invention. Several of these potential modifications have been mentioned, and other will be apparent to those skilled in the art. For example, the peeler tip edges need not be located on a constant radius, and could alternately be located in their respective non-parallel orientations independently of the conformation of the surround top portion (e.g., 33 and 133). Similarly, the peeler edges could be located along a non-constant geometric surface, such as an ellipse, ovate or obround surface, or the like. Accordingly, the scope of the present invention should be considered in terms of the following claims and is understood not to be limited to the details of structure and operation shown and described in the specification and drawings.

I claim:

1. An improved flexible tape drive system of the type where a flexible yet relatively longitudinally rigid drive tape is reciprocated by a toothed cog drive arrangement to provide push/pull driving power, said system comprising:

a substantially circular cog wheel for driving said flexible tape and having an outer base surface of predetermined base diameter and a plurality of radially extending teeth spaced about the periphery of said base surface said teeth generally corresponding in size and shape with the perforations of said drive tape;

a cog wheel surround having top and bottom portions, and comprising an outer guide track having an inner cog race with an inner surface having a surround diameter slightly larger than said base diameter of said cog and spaced in substantially parallel relationship therewith, said outer guide track surrounding a substantial portion of said cog wheel in use;

spaced tape entrance and exit slots adjacent said cog surround through which said flexible drive tape alternately enters said cog wheel surround, wraps around a substantial portion of said cog wheel within the bottom of said surround, and exits said surround; and a pair of oppositely disposed peeler tips situated adjacent said cog wheel surround between said outer guide track and said cog wheel and adjacent said entrance and exit slots, said tips each having a peeler edge with an arcuate inner face extending from said edge and at a non-parallel orientation relative to and spaced in close proximity with said base surface, thereby effectively inwardly disposing said edge toward said base surface to positively peel said drive tape away from said cog wheel and to direct said tape through an adjacent entrance or exit slot.

2. The tape drive system of claim 1, wherein said arcuate inner surfaces of said tips are located on a substantially constant arcuate radius.

3. The tape drive system of claim 2, wherein said arcuate radius of said tips is substantially the same as the radius of said outer base surface.

4. The tape drive system of claim 3, wherein said peeler tips each comprise a tooth relief recess along said peeler edge to accommodate said cog teeth without interference.

5. The tape drive system of claim 2, wherein said base radius has a base center point at the center of said cog wheel, and said arcuate radius along which said tips are located has a center point offset at a predetermined distance from said center of said cog wheel.

6. The tape drive system of claim 5, wherein said arcuate radius is smaller than the radius of said outer base surface.

7. The tape drive system of claim 2, wherein said arcuate radius is smaller than the radius of said surround.

8. The tape drive system of claim 7, wherein said arcuate radius is smaller than the radius of said outer base surface.

9. The tape drive system of claim 2, wherein said arcuate radius of said tips is non-concentric with said outer base surface radius.

10. An improved flexible tape drive system of the type wherein a flexible yet relatively longitudinally rigid perforated drive tape is reciprocated by a toothed cog drive arrangement to provide both push and pull driving power as a result of alternating rotation of said cog, said system comprising:

a substantially cylindrical cog wheel for driving said flexible tape and having an outer base surface of predetermined base radius and a plurality of radially extending teeth spaced about the periphery of said base surface defining a predetermined tooth radius larger than said base radius, said teeth generally corresponding in size and shape with the perforations of said drive tape;

a cog wheel surround having a top and bottom, and comprising an outer guide track having an inner cog race with an inner surface having a surround radius slightly larger than said base radius of said cog and spaced in substantially parallel relationship therewith, said outer guide track surrounding a substantial portion of said cog wheel in use and further comprising a peripheral groove along said inner surface to accommodate said cog teeth without substantial interference;

spaced tape entrance and exit slots in said cog surround through which said flexible drive tape alternately enters cog wheel surround, wraps around a substantial portion of said cog wheel within the bottom of said surround, and exits said surround, said drive tape wrapping around at least 120 degrees of said periphery of said cog wheel; and a pair of oppositely disposed peeler tips each situated adjacent said cog wheel surround adjacent one of said entrance and exit slots between said outer guide track and said cog wheel, said tips each having a peeler edge having an arcuate inner face extending from said edge at a non-parallel orientation relative to and spaced in close proximity with said base surface and said tips located on a substantially constant arcuate radius, thereby effectively inwardly disposing said edge toward said base surface to positively peel said drive tape away from said cog wheel and direct said tape through the adjacent entrance or exit slot, respectively.

11. The tape drive system of claim 10, wherein said arcuate radius of said tips is substantially the same as the radius of said outer base surface.

12. The tape drive system of claim 10, wherein said arcuate radius of said tips is non-concentric with said outer base surface radius.

13. The tape drive system of claim 10, wherein said arcuate radius along which said tips are located has a center point offset at a predetermined distance from the center of said cog wheel.

14. The tape drive system of claim 10, wherein the said arcuate radius is smaller than said surround radius.

15. The tape drive system of claim 10, wherein said arcuate radius is smaller than the radius of said outer base surface.

16. The tape drive system of claim 10, wherein said peeler tips each comprise a tooth relief along said peeler edge to accommodate said cog teeth without interference.

17. A mechanism for alternately reciprocating a movable device among a plurality of positions, said mechanism comprising a flexible tape drive system of the type wherein a flexible yet relatively longitudinally rigid perforated drive tape is reciprocated by a toothed cog drive arrangement to provide both push and pull driving power as a result of alternating rotation of said cog, and said system further comprising:

a substantially cylindrical cog wheel for driving said flexible tape and having an outer base surface of predetermined base diameter and a plurality of radially extending teeth spaced about the periphery of said base surface defining a predetermined tooth radius larger than said base radius, said teeth generally corresponding in size and shape with the perforations of said drive tape;

a cog wheel surround having a top and bottom, and comprising an outer guide track having an inner cog race with an inner surface having a surround radius slightly larger than said base radius of said cog and spaced in substantially parallel relationship therewith, said outer guide track surrounding a substantial portion of said cog wheel in use and further comprising a peripheral groove along said inner surface to accommodate said cog teeth without substantial interference;

spaced tape entrance and exit slots adjacent the top of said cog surround through which said flexible drive tape alternately enters said cog wheel surround, wraps around a substantial portion of said cog wheel within the bottom of said surround, and exits said surround, said drive tape wrapping around at least 120 degrees of said periphery of said cog wheel; and a pair of oppositely disposed peeler tips each situated adjacent the top of said cog wheel surround adjacent one of said entrance and exit slots between said outer guide track and said cog wheel, said tips each having a peeler edge having an arcuate inner face extending from said edge at a non-parallel orientation relative to and space din close proximity with said base surface and said tips located on a substantially constant arcuate radius, said edges being inwardly disposed toward said base surface to prevent said tape from working its way underneath a peeler tip, to positively peel said drive tape away from said cog wheel, and to direct said tape through the adjacent entrance or exit slot, respectively.

18. The mechanism of claim 17, wherein said arcuate radius along which said tips are located has a center point offset at a predetermined distance from the center of said cog wheel.

19. The tape drive system of claim 17, wherein said arcuate radius is smaller than the radius of said surround.

20. The tape drive system of claim 17, wherein said arcuate radius is smaller than the radius of said outer base surface.

* * * * *

UNITED STATES PATENT AND TRADEMARK OFFICE
CERTIFICATE OF CORRECTION

PATENT NO. : 5,232,408
DATED : August 3, 1993
INVENTOR(S) : Michael E. Brown

It is certified that error appears in the above—identified patent and that said Letters Patent is hereby corrected as shown below:

In column 8, line 17, [claim 1], "where a flexible yet relatively longitudinally rigid drive", should read, --wherein a flexible yet relatively longitudinally rigid perforated drive--

In column 9, line 39, [claim 10] "said" should be inserted after --enters--

In column 10, line 48, [claim 17] "space din" should read --spaced in--

Signed and Sealed this

Fifteenth Day of March, 1994

Attest:

BRUCE LEHMAN

*Attesting Officer*    Commissioner of Patents and Trademarks